(12) United States Patent
Kim et al.

(10) Patent No.: US 8,736,786 B2
(45) Date of Patent: May 27, 2014

(54) LIQUID CRYSTAL DISPLAY

(75) Inventors: Tae-Eun Kim, Yongin (KR); Tae-Joon Kim, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 472 days.

(21) Appl. No.: 12/904,096

(22) Filed: Oct. 13, 2010

(65) Prior Publication Data

US 2011/0187634 A1    Aug. 4, 2011

(30) Foreign Application Priority Data

Feb. 1, 2010    (KR) .......................... 10-2010-0009247

(51) Int. Cl.
*G02F 1/1333*    (2006.01)
(52) U.S. Cl.
USPC ............................................. 349/60; 349/58
(58) Field of Classification Search
USPC .................................................... 349/58–65
See application file for complete search history.

(56) References Cited

FOREIGN PATENT DOCUMENTS

| JP | 09-211447 | | 8/1997 |
|---|---|---|---|
| KR | 100290775 | B1 | 3/2001 |
| KR | 10-2008-0016218 | A | 2/2008 |
| KR | 10-2008-0018307 | A | 2/2008 |
| KR | 10-2008-0058796 | A | 6/2008 |
| KR | 10-2008-0089897 | A | 10/2008 |

*Primary Examiner* — Dung Nguyen
(74) *Attorney, Agent, or Firm* — Knobbe Martens Olson & Bear LLP

(57) ABSTRACT

A liquid crystal display is disclosed. In one embodiment, the display includes i) a liquid crystal display panel configured to display images, ii) a backlight unit configured to provide light to the liquid crystal display panel and iii) a mold frame comprising a frame main body and a plurality of first side walls, wherein the frame main body is configured to receive the backlight unit, and wherein the first side walls are formed on a top surface of the frame main body. The display may further include a bottom chassis comprising a bottom plate and a plurality of second side walls, wherein the bottom plate is configured to support the mold frame and wherein the second side walls are formed at edges of the bottom plate. The first and second side walls surround side surfaces of the liquid crystal display panel while not contacting the side surfaces, and the first and second side walls are alternately disposed along a circumferential direction of the liquid crystal display panel.

22 Claims, 3 Drawing Sheets

LIQUID CRYSTAL DISPLAY

RELATED APPLICATIONS

This application claims priority to and the benefit of Korean Patent Application No. 10-2010-0009247 filed in the Korean Intellectual Property Office on Feb. 1, 2010, the entire contents of which are incorporated herein by reference.

BACKGROUND

1. Field

The described technology generally relates to a liquid crystal display (LCD) and more particularly, to a mold frame and a bottom chassis that support a liquid crystal display panel and a backlight unit.

2. Description of the Related Technology

A liquid crystal display (LCD) is generally thin and light, and consumes low power. For this reason, the liquid crystal display (LCD) has been widely used across a large gamut of products ranging from a mobile electronic device such as mobile communication terminals to billboard displays.

SUMMARY

One inventive aspect is a liquid crystal display (LCD) capable of reducing the outer size of a liquid crystal display panel by improving a structure of a mold frame and a bottom chassis.

Another aspect is a liquid crystal display (LCD), including: i) a liquid crystal display panel that displays images, ii) a backlight unit that includes a light source to provide light to the liquid crystal display panel, iii) a mold frame that includes a frame main body forming an inner space receiving the backlight unit and a first side wall formed on a top surface of the frame main body, and iv) a bottom chassis that includes a bottom plate supporting the mold frame and a second side wall formed at an edge of the bottom plate. The first side wall and the second side wall are alternately disposed along a circumference direction of the liquid crystal display panel from the outside of the liquid crystal display panel.

The liquid crystal display panel may include a pair of long side portions and a pair of short side portions. The first side wall may be positioned at the outsides of corner edges of the long side portion and the short side portion and the second side wall is disposed at the outsides of the center of the long side portion and the center of the short side portion.

The first side wall may face the side of the liquid crystal display panel at a first interval and the second side wall may face the side of the liquid crystal display panel at a second interval.

The frame main body may be formed in a frame shape that surrounds the side of the backlight unit. The backlight unit is disposed on the bottom plate and a buffer tape may be disposed between the backlight unit and the bottom plate. The thickness of the frame main body may equal to a sum of the thickness of the backlight unit and the thickness of the buffer tape.

The first side wall may include a first sub-side wall and a second sub-side wall having the same height. The first sub-side wall may be disposed at the long side portion of the frame main body and the second sub-side wall may be disposed at the short side portion of the frame main body. The first sub-side wall may have a length larger than the second sub-side wall.

The mold frame may be manufactured in an injection molding manner and the first side wall may have a minimum thickness of 0.3 mm. The second side wall may include an outer side portion bent from the bottom plate and an inner side portion bent from the outer side portion toward the bottom plate.

Another aspect is a liquid crystal display, comprising: a liquid crystal display panel configured to display images; a backlight unit configured to provide light to the liquid crystal display panel; a mold frame comprising a frame main body and a plurality of first side walls, wherein the frame main body is configured to receive the backlight unit, and wherein the first side walls are formed on a top surface of the frame main body; and a bottom chassis comprising a bottom plate and a plurality of second side walls, wherein the bottom plate is configured to support the mold frame and wherein the second side walls are formed at edges of the bottom plate, wherein the first side walls and the second side walls surround side surfaces of the liquid crystal display panel while not contacting the side surfaces, and wherein the first and second side walls are alternately disposed along a circumferential direction of the liquid crystal display panel.

In the above display, the liquid crystal display panel comprises a pair of long side portions and a pair of short side portions connected to the long side portions, wherein the first side walls are disposed adjacent to corner edges of the long side portions and the short side portions, and wherein each of the second side walls is disposed between adjacent first side walls.

In the above display, the first side walls do not contact the second side walls. In the above display, the frame main body has a frame shape and surrounds a side of the backlight unit. In the above display, the backlight unit is disposed on the bottom plate, and wherein a buffer tape is disposed between the backlight unit and the bottom plate. In the above display, the thickness of the frame main body substantially equals to the sum of the thickness of the backlight unit and the thickness of the buffer tape.

In the above display, each of the first side walls includes a first side wall portion and a second side wall portion having substantially the same height. In the above display, the first side wall portion is disposed at the long side portions of the frame main body, and wherein the second side wall portion is disposed at the short side portions of the frame main body.

In the above display, the first side wall portion is longer than the second side wall portion. In the above display, at least one of the first side walls has a minimum thickness of about 0.3 mm. In the above display, each of the second side walls includes i) an outer side portion extending from the bottom plate in a direction substantially perpendicular to the bottom plate and ii) an inner side portion bent from the outer side portion toward the bottom plate. In the above display, the number of the first side walls is four, and wherein the number of the second side walls is four.

Another aspect is a liquid crystal display, comprising: a liquid crystal display panel configured to display an image; a frame having a surrounding portion, wherein a recess is defined within the surrounding portion, wherein the frame is configured to receive a backlight unit via the recess, wherein the surrounding portion has a bottom surface and a top surface, and wherein the top surface is closer to the display panel than the bottom surface; a plurality of first side walls formed on the top surface of the surrounding portion of the frame, wherein the first side walls are spaced apart from each other; a chassis contacting the bottom surface of the surrounding portion of the frame; and a plurality of second side walls formed in the chassis and extending toward the frame, wherein the second side walls are spaced apart from each other, and wherein each of the first side walls is formed between two adjacent second side walls, wherein the distance between i) the center of the liquid crystal display panel and ii) the first and second side walls is greater than the distance between iii) the center of the liquid crystal display panel and side surfaces of the liquid crystal display panel.

In the above display, the surrounding portion of the frame has a rectangular shape, and wherein the first side walls are formed at the corners of the rectangular surrounding portion. In the above display, each of the first side walls includes a first side wall portion and a second side wall portion which are formed in the bordering sides of the rectangular surrounding portion.

In the above display, the first side wall portion and the second side wall portion have substantially the same height. In the above display, the first side wall portion is longer than the second side wall portion. In the above display, each of the second side walls includes i) an outer side portion extending from the bottom plate in a direction substantially perpendicular to the bottom plate and ii) an inner side portion bent from the outer side portion toward the bottom plate. In the above display, the first side walls do not contact the second side walls. In the above display, at least one of the first side walls has a minimum thickness of about 0.3 mm.

DETAILED DESCRIPTION

A liquid crystal display (LCD) includes i) a liquid crystal display panel that displays images, ii) a panel driver that applies driving signals to the liquid crystal display panel, and iii) a backlight unit that applies light to the liquid crystal display panel. The liquid crystal display panel, the panel driver, and the backlight unit are fixed to an assembly of a mold frame and a bottom chassis. The mold frame includes a first side wall that surrounds the side of the liquid crystal display panel and the bottom chassis includes a second side wall that surrounds the first side wall.

Recently, in order to increase portability and spatial utility, there has been a tendency to reduce the external dimension or outer size of the liquid crystal display panel. Herein, the outer size of the liquid crystal display panel means the width of the outer portion of the liquid crystal display panel of the liquid crystal display (LCD). In other words, the outer size of the liquid crystal display panel is defined as the sum of i) the distance between the liquid crystal display panel and the first side wall, ii) the thickness of the first side wall, iii) the distance between the first side wall and the second side wall, and iv) the thickness of the second side wall. Generally, for a three-inch liquid crystal display (LCD) or larger, the outer size thereof is about 0.8 mm to about 1 mm.

Among the above-mentioned variables, one that has the greatest effect on the outer size of the liquid crystal display panel is the thickness of the first side wall, which is approximately 0.6 mm. However, this thickness is the minimum width for injection molding process, that is, a threshold value that is difficult to further reduce to maintain a standard level of performance. Therefore, a need exists for a method for controlling remaining variables other than the thickness of the first side wall.

However, when the distance between the liquid crystal display panel and the first side wall is reduced, there is a risk of causing cracks in the liquid crystal display panel during the assembly process or a drop test. Further, when the distance between the first side wall and the second side wall is reduced, defects in fastening with the bottom chassis may occur. When the thickness of the second side wall is reduced, the mechanical strength of the bottom chassis is reduced and it is difficult to obtain a chassis made of stainless steel with a dimension less than about 0.15 mm.

Hereinafter, embodiments of the present invention will be described more fully with reference to the accompanying drawings, in which exemplary embodiments of the invention are shown. As those skilled in the art would realize, the described embodiments may be modified in various different ways, all without departing from the spirit or scope of the present invention.

Figure 1:
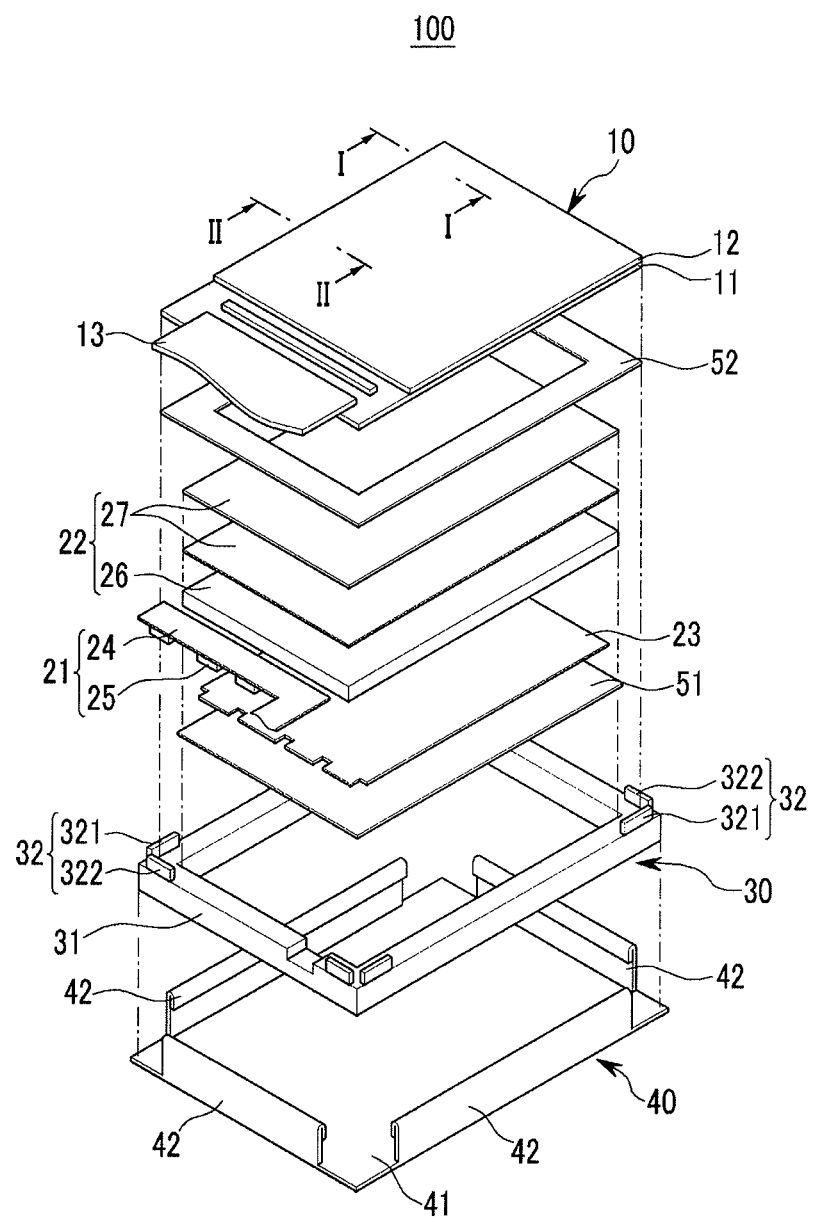
FIG. 1 is an exploded perspective view of a liquid crystal display
(LCD) according to an exemplary embodiment.
Figure 2:
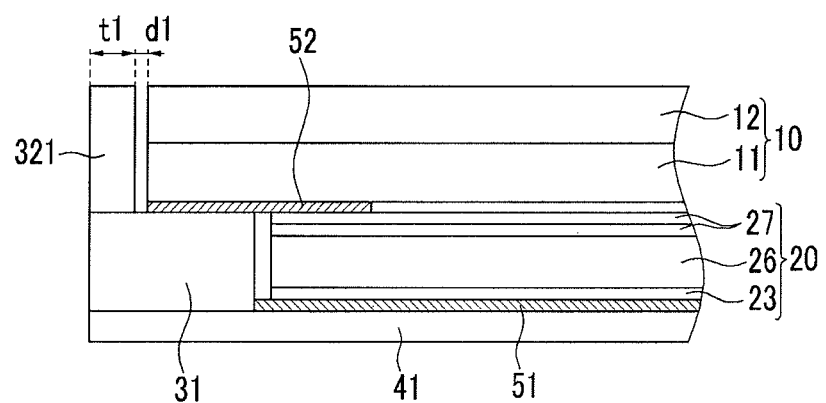
FIG. 2 is a cross-sectional view showing a coupling state of the liquid crystal display (LCD) taken along the line I-I of FIG. 1.
Figure 3:
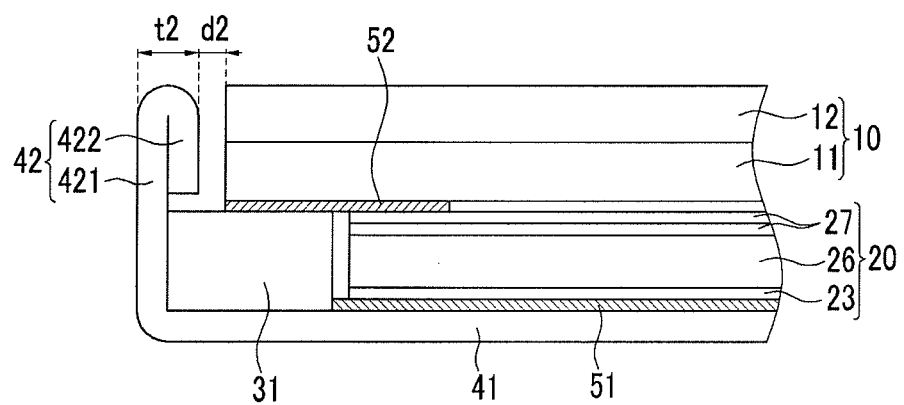
FIG. 3 is a cross-sectional view showing a coupling state of the liquid crystal display (LCD) taken along the line II-II of FIG. 1.

FIG. 1 is an exploded perspective view of a liquid crystal display (LCD) according to an exemplary embodiment, FIG. 2 is a cross-sectional view showing a coupling state of the liquid crystal display (LCD) taken along the line I-I of FIG. 1, and FIG. 3 is a cross-sectional view showing a coupling state of the liquid crystal display (LCD) taken along the line II-II of FIG. 1.

Referring to FIGS. 1 to 3, a liquid crystal display (LCD) 100 of the present exemplary embodiment includes a liquid crystal display panel 10, a backlight unit 20, a mold frame 30, and a bottom chassis 40. The backlight unit 20 provides light to the liquid crystal display panel 10 and the liquid crystal display panel 10 displays images. The mold frame 30 and the bottom chassis 40 support the liquid crystal display panel 10 and the backlight unit 20.

The liquid crystal display panel 10 includes a thin film transistor substrate 11, a color filter substrate 12, and a liquid crystal layer (not shown) inserted between two substrates 11 and 12. A flexible circuit board 13 is fixed to one end of the thin film transistor substrate 11. The flexible circuit board 13 is connected to a driving circuit and a panel driver (not shown) formed of a printed circuit board on which the driving circuit is mounted. Thereby, the flexible circuit board 13 transmits video signals and driving voltage generated from the panel driver to the thin film transistor substrate 11.

The backlight unit 20 includes i) a light source unit 21, ii) a light guide unit 22 and iii) a reflecting film 23, and is disposed on the bottom portion of the liquid crystal display panel 10.

The light source unit 21 includes a printed circuit film 24 and at least one light emitting diode 25 mounted on the printed circuit film 24. Of course, the light source unit 21 may include a light emitting diode 25 that is a point light source as well as a cold cathode fluorescent lamp (CCFL) that is a line light source.

The light guide unit 22 includes a light guide plate 26 and at least one optical sheet 27. The light guide plate 26 is disposed at one side of the light source unit 21 and emits light emitted from the light source unit 21 to the top portion on which the liquid crystal display panel 10 is disposed. The optical sheet 27 is disposed between the light guide plate 26 and the liquid crystal display panel 10 and diffuses or collects light emitted from the light guide plate 26. The reflecting film 23 is disposed on the bottom portion of the light guide plate 26 and reflects light emitted from the light guide plate 26 to the bottom to the top portion.

The mold frame 30 may be formed of polymer resin such as plastic and may be manufactured in an injection molding manner. The mold frame 30 includes a frame main body 31 forming an inner space in which the backlight unit 20 is received and a first side wall 32 protruded to the liquid crystal display panel 10 from the top surface of the frame main body 31.

The frame main body 31 may be formed in a frame shape of which the center is open. Therefore, the frame main body 31 surrounds and supports the side of the backlight unit 20 and the backlight unit 20 is disposed on a bottom plate 41 of the bottom chassis 40. In this case, the thickness of the liquid crystal display (LCD) 100 can be reduced.

A buffer tape 51 absorbing external impact may be disposed between the backlight unit 20 and the bottom plate 41. The thickness of the frame main body 31 may be substantially equal to the sum of the thickness of the backlight unit 20 and the thickness of the buffer tape 51. Thereby, the top surface of the frame main body 31 and the top surface of the optical sheet 27 are maintained at substantially the same height.

The liquid crystal display panel 10 may be formed in a substantially rectangular shape including a pair of long side portions and a pair of short side portions and may be fixed on the frame main body 31 by an adhesive tape 52. The adhesive tape 52 has a frame shape of which the center is open and may be disposed on an edge of the optical sheet 27 and a portion of the top surface of the frame main body 31. Thereby, the backlight unit 20 and the frame main body 31 supports the liquid crystal display panel 10.

The first side wall 32 of the mold frame 30 is disposed at the corner edge of the top surface of the frame main body 31 and faces the corner edge portion of the side of the liquid crystal display panel 10. The first side wall 32 may include a first sub-side wall (or first side wall portion) 321 and a second sub-side wall (or second side wall portion) 322 that have substantially the same height and is disposed at a distance from each other.

The first sub-side wall 321 is disposed at the corner edge of the long side portion of the frame main body 31 and the second sub-side wall 322 is disposed at the corner edge of the short side portion of the frame main body 31. In one embodiment, the first sub-side wall 321 is longer than the second sub-side wall 322, such that it faces the side of the liquid crystal display panel 10 at a wider area.

When the backlight unit 20 and the liquid crystal display panel 10 are assembled, the first side wall 32 guides the movement of the liquid crystal display panel 10 and prevents the defect, such as a short circuit due to the conductive layer being exposed to the edge of the liquid crystal display panel 10 due to contact with the bottom chassis 40 made of a metal.

In the present exemplary embodiment, the first side wall 32 of the mold frame 30 is not disposed at or adjacent to the center of the long side portion of the frame main body 31 and the center of the short side portion thereof but at the corner edge thereof. Although the first side wall 32 is disposed at the corner edge, it can guide the movement of the liquid crystal display panel 10 and pr event the liquid crystal display panel 10 from contacting the bottom chassis 40.

The shape of the first side wall 32 can be variously changed without limiting to the foregoing embodiments. For example, the first sub-side wall and the second sub-side wall may be formed to contact each other and may be formed in various shapes such as a bar shape or a cylindrical shape.

Figure 4:
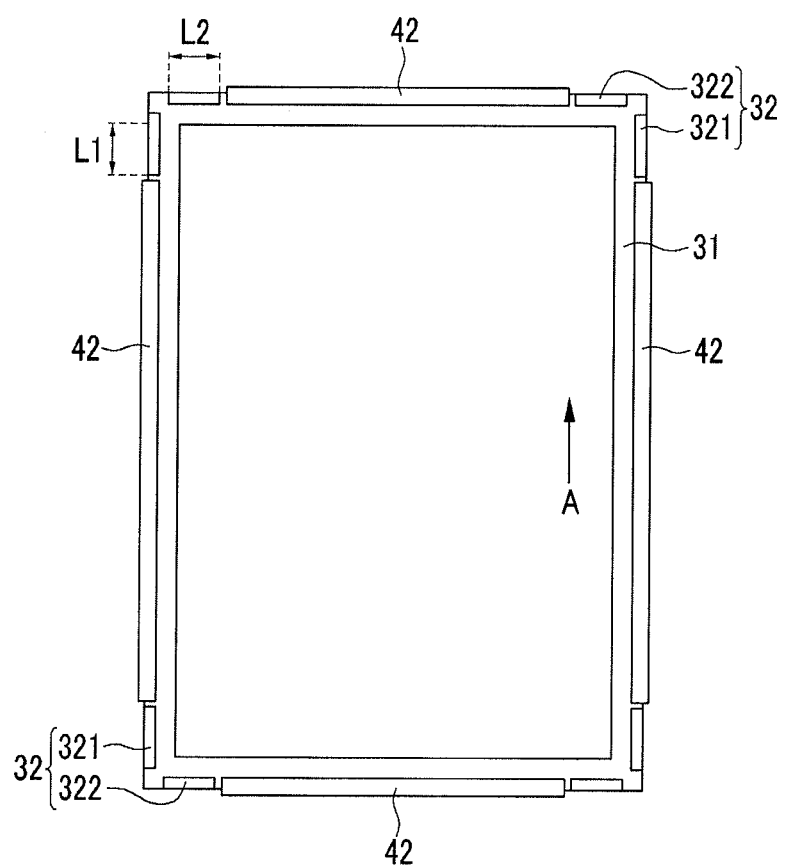
FIG. 4 is a plan view showing an assembly state of a mold frame and a bottom chassis of the liquid crystal display device shown in FIG. 1.

The bottom chassis 40 includes the bottom plate 41 that supports the backlight unit 20 and the mold frame 30 and the second side wall 42 that extends to the liquid crystal display panel 10 from the edge of the bottom plate 41. FIG. 4 is a plan view showing an assembly state of the mold frame and the bottom chassis of the liquid crystal display device shown in FIG. 1.

Referring to FIGS. 1 and 4, the second side wall 42 of the bottom chassis 40 is disposed at the remaining regions other than the corner edge of the bottom plate 41. In other words, the second side wall 42 is disposed at or adjacent to the center of the long side portion of the bottom plate 41 and the center of the short side portion thereof and does not face the first side wall 32 of the mold frame 30. That is, the first side wall 32 and the second side wall 42 are alternately disposed along the circumference direction (see arrow A of FIG. 4) of the liquid crystal display panel 10 from the outside of the liquid crystal display panel 10.

Referring again to FIGS. 1 to 3, the second side wall 42 of the bottom chassis 40 may be formed by a process of bending the bottom chassis 40 in a flat shape several times. The second side wall 42 of the bottom chassis 40 includes an outer side portion 421 bent by about 90° from the bottom plate 41 and an inner side portion 422 bent by about 180° from the outer side portion 421. In one embodiment, the second side wall 42 is formed to be stronger than the single side wall structure since force applied from the outside is dispersed to the inner side portion 422 and the outer side portion 421 that are connected to each other and the bottom plate 41.

The mold frame 30 may be manufactured by seating the bottom chassis 40 manufactured by the foregoing bending process in an injection molding and then, injection-molding polymer resin. This is called an insert molding method and the mold frame 30 is integrally combined with the bottom chassis 40.

In the liquid crystal display (LCD) 100 of the present exemplary embodiment, the first side wall 32 is disposed at the outside of or adjacent to the corner edge of the liquid crystal display panel 10 and the second side wall 42 is disposed at the outside of or adjacent to the center of the long side portion of the liquid crystal display panel 10 and the center of the short side portion thereof other than the corner edge. In one embodiment, only one of the first side wall 32 and the second side wall 42 is disposed at the outside of the liquid crystal display panel 10 without the first side wall 32 and the second side wall 42 overlapping, such that the outer size of the liquid crystal display panel 10 is reduced.

Herein, the outer size of the liquid crystal display panel 10, which is the outer width of the liquid crystal display panel 10 of the liquid crystal display device 100, is defined as the distance of the assembly of the mold frame 30 and the bottom chassis 40 from the side of the liquid crystal display panel 10.

As shown in FIG. 2, the first sub-side wall 32, for example, the first sub-side wall 321 is disposed at the outside of or adjacent to the corner edge of the liquid crystal display panel 10. Therefore, the outer size of the liquid crystal display panel 10 at the corner edge is defined as the sum of i) the distance between the liquid crystal display panel 10 and the first sub-side wall 321 (first interval, d1) and ii) the thickness (t1) of the first sub-side wall 321.

Since the first side wall 32 of the mold frame 30 is formed to have a relative short length, the thickness of the first side wall 32 can be reduced when the mold frame 30 is manufactured in the injection molding manner. Herein, the length of the first side wall 32 means the length of the first side wall 321 (L1, see FIG. 4) or the length of the second side wall (L2, see FIG. 4).

In the general injection molding process, when the first side wall has a length of about 50 mm or more, the thickness of the first side wall can be formed up to about 0.6 mm to the minimum.

However, in the liquid crystal display (LCD) 100 of the present exemplary embodiment, since the first side wall 32 is disposed at or adjacent to the corner edge of the frame main body 31, the thickness t1 of the first side wall 32 can be reduced up to about 0.3 mm to the minimum due to the reduction of length. Therefore, the thickness t1 of the first sub side wall 321 may be approximately about 0.3 mm and the first interval d1 may be approximately about 0.1 mm. In this case, the outer size (t1+d1) of the liquid crystal display panel 10 is approximately 0.4 mm.

As shown in FIG. 3, the second side wall 42 is disposed at the outsides of the center of the long side portion of the liquid crystal display panel 10 and the center of the short side portion thereof. Therefore, the outer size of the liquid crystal display panel 10 at the center of the long side portion and the center of the short side portion is defined as the sum of i) the distance (second interval, d2) between the liquid crystal display panel 10 and the second side wall and ii) the thickness t2 of the second side wall 42.

When the bottom chassis is manufactured using a stainless steel having the thickness of approximately 0.15 mm, the thickness of the second side wall 42 may be approximately 0.3 mm, adding the outer side portion 421 and the inner side portion 422. The second interval d2 may be approximately 0.1 mm and the outer size (t2+d2) of the liquid crystal display panel 10 may be approximately 0.4 mm.

As described above, the liquid crystal display (LCD) 100 of the present exemplary embodiment can reduce the outer size of the liquid crystal display panel to about 0.5 mm or less while maintaining the inherent function of the first side wall 32 as it is, which guides the movement of the liquid crystal display panel 10 and prevents the liquid crystal display panel 10 from contacting the bottom chassis 40. As a result, the portability and spatial utility of the liquid crystal display (LCD) 100 can be improved.

At least one embodiment can reduce the external dimension of the liquid crystal display panel while maintaining the inherent function of the first side wall, which guides the movement of the liquid crystal display panel and prevents the display panel from contacting the bottom chassis. As a result, the portability and spatial utility of the liquid crystal display (LCD) can be improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a liquid crystal display panel configured to display images;
   a backlight unit configured to provide light to the liquid crystal display panel;
   a mold frame comprising a frame main body and a plurality of first side walls, wherein the frame main body is configured to receive the backlight unit, and wherein the first side walls are formed on a top surface of the frame main body; and
   a bottom chassis comprising a bottom plate and a plurality of second side walls, wherein the bottom plate is configured to support the mold frame and wherein the second side walls are formed at edges of the bottom plate, wherein the first side walls and the second side walls surround side surfaces of the liquid crystal display panel while not contacting the side surfaces, wherein the side surfaces comprise a first side surface and a second side surface opposing each other, wherein the first and second side walls do not overlap each other in a direction extending from the first side surface to the second side surface, and wherein the first and second side walls are alternately disposed along a circumferential direction of the liquid crystal display panel.

2. The liquid crystal display of claim 1, wherein the liquid crystal display panel comprises a pair of long side portions and a pair of short side portions connected to the long side portions,
   wherein the first side walls are disposed adjacent to corner edges of the long side portions and the short side portions, and
   wherein each of the second side walls is disposed between adjacent first side walls.

3. The liquid crystal display of claim 2, wherein the first side walls do not contact the second side walls.

4. The liquid crystal display of claim 2, wherein the frame main body has a frame shape and surrounds a side of the backlight unit.

5. The liquid crystal display of claim 4, wherein the backlight unit is disposed on the bottom plate, and wherein a buffer tape is disposed between the backlight unit and the bottom plate.

6. The liquid crystal display of claim 5, wherein the thickness of the frame main body substantially equals to the sum of the thickness of the backlight unit and the thickness of the buffer tape.

7. The liquid crystal display of claim 2, wherein each of the first side walls includes a first side wall portion and a second side wall portion having substantially the same height.

8. The liquid crystal display of claim 7, wherein the first side wall portion is disposed at the long side portions of the frame main body, and wherein the second side wall portion is disposed at the short side portions of the frame main body.

9. The liquid crystal display of claim 8, wherein the first side wall portion is longer than the second side wall portion.

10. The liquid crystal display of claim 2, wherein at least one of the first side walls has a minimum thickness of about 0.3 mm.

11. The liquid crystal display of claim 2, wherein each of the second side walls includes i) an outer side portion extending from the bottom plate in a direction substantially perpendicular to the bottom plate and ii) an inner side portion bent from the outer side portion toward the bottom plate.

12. The liquid crystal display of claim 2, wherein the number of the first side walls is four, and wherein the number of the second side walls is four.

13. The liquid crystal display of claim 12, wherein at least one of the first side walls has a minimum thickness of about 0.3 mm.

14. The liquid crystal display of claim 1, wherein each of the first side walls comprises a first surface facing the liquid crystal display panel, wherein each of the second side walls comprises a second surface facing the liquid crystal display panel, and wherein the distance between the first surface and an outer side of the liquid crystal display panel is the same as the distance between the second surface and the outer side of the liquid crystal display panel.

15. A liquid crystal display, comprising:
   a liquid crystal display panel configured to display an image;

a frame having a surrounding portion, wherein a recess is defined within the surrounding portion, wherein the frame is configured to receive a backlight unit via the recess, wherein the surrounding portion has a bottom surface and a top surface, and wherein the top surface is closer to the display panel than the bottom surface;

a plurality of first side walls formed on the top surface of the surrounding portion of the frame, wherein the first side walls are spaced apart from each other;

a chassis contacting the bottom surface of the surrounding portion of the frame; and a plurality of second side walls formed in the chassis and extending toward the frame, wherein the second side walls are spaced apart from each other, and wherein each of the first side walls is formed between two adjacent second side walls, wherein the distance between i) the center of the liquid crystal display panel and ii) the first and second side walls is greater than the distance between iii) the center of the liquid crystal display panel and side surfaces of the liquid crystal display panel, wherein the side surfaces comprise a first side surface and a second side surface opposing each other, and wherein the first and second side walls do not overlap each other in a direction extending from the first side surface to the second side surface.

16. The liquid crystal display of claim 15, wherein the surrounding portion of the frame has a rectangular shape, and wherein the first side walls are formed at the corners of the rectangular surrounding portion.

17. The liquid crystal display of claim 16, wherein each of the first side walls includes a first side wall portion and a second side wall portion which are formed in the bordering sides of the rectangular surrounding portion.

18. The liquid crystal display of claim 17, wherein the first side wall portion and the second side wall portion have substantially the same height.

19. The liquid crystal display of claim 17, wherein the first side wall portion is longer than the second side wall portion.

20. The liquid crystal display of claim 15, wherein each of the second side walls includes i) an outer side portion extending from the bottom plate in a direction substantially perpendicular to the bottom plate and ii) an inner side portion bent from the outer side portion toward the bottom plate.

21. The liquid crystal display of claim 15, wherein the first side walls do not contact the second side walls.

22. The liquid crystal display of claim 15, wherein each of the first side walls comprises a first surface facing the liquid crystal display panel, wherein each of the second side walls comprises a second surface facing the liquid crystal display panel, and wherein the distance between the first surface and an outer side of the liquid crystal display panel is the same as the distance between the second surface and the outer side of the liquid crystal display panel.

* * * * *